(12) United States Patent
Bücker et al.

(10) Patent No.: US 9,614,413 B2
(45) Date of Patent: Apr. 4, 2017

(54) ACTUATING DRIVE WITH ELECTRIC MOTOR AND GEARING THEREOF

(71) Applicant: Hella KGaA Hueck & Co., Lippstadt (DE)

(72) Inventors: Bodo Bücker, Arnsberg (DE); Dietmar Münker, Paderborn (DE); Volkmar Stebner, Büren (DE)

(73) Assignee: HELLA KGAA, Lippstadt (DE)

( * ) Notice: Subject to any disclaimer, the term of this patent is extended or adjusted under 35 U.S.C. 154(b) by 426 days.

(21) Appl. No.: 14/031,112

(22) Filed: Sep. 19, 2013

(65) Prior Publication Data

US 2014/0091658 A1     Apr. 3, 2014

(30) Foreign Application Priority Data

Sep. 20, 2012   (DE) ................ 10 2012 108 853

(51) Int. Cl.
| | |
|---|---|
| *H02K 5/10* | (2006.01) |
| *H02K 7/10* | (2006.01) |
| *H02K 5/00* | (2006.01) |
| *H02K 7/116* | (2006.01) |
| *H02K 5/04* | (2006.01) |

(52) U.S. Cl.
CPC .............. *H02K 7/116* (2013.01); *H02K 5/04* (2013.01); *H02K 7/1166* (2013.01)

(58) Field of Classification Search
CPC ................................ H02K 11/00; H02K 5/00
USPC ........ 310/75 R, 83, 404, 413, 417, 422, 423
See application file for complete search history.

(56) References Cited

U.S. PATENT DOCUMENTS

| | | | | |
|---|---|---|---|---|
| 3,745,393 | A * | 7/1973 | Spors ..................... | H02K 5/148 |
| | | | | 310/239 |
| 4,413,200 | A * | 11/1983 | Fenicle .......................... | 310/239 |
| 6,727,619 | B1 * | 4/2004 | Blum .............................. | 310/91 |
| 2006/0283278 | A1 * | 12/2006 | Koster et al. ................... | 74/414 |

* cited by examiner

Primary Examiner — Jose Gonzalez Quinones
(74) Attorney, Agent, or Firm — Husch Blackwell LLP

(57) ABSTRACT

An actuating drive includes an electric motor and a gearing arranged in a housing which is open on one side and which is closed by a cover. The electric motor is mounted in a recess bulge of the housing which is substantially sealed off from the gearing. The configuration provides a precise positioning of the electric motor relative to a first axle, wherein a first gear of the gearing is assigned to the same and wherein the actuating drive can be manufactured more simply and more cost-effectively than was previously possible. This is achieved in that the electric motor is attached indirectly to the housing by means of an accordingly shaped metal sheet, and is positioned in a predetermined location with no radial or axial play.

6 Claims, 3 Drawing Sheets

ACTUATING DRIVE WITH ELECTRIC MOTOR AND GEARING THEREOF

CROSS REFERENCE

This application claims priority to German Patent Application No. 10 2012 108853.5, filed Sep. 20, 2012.

TECHNICAL FIELD OF THE INVENTION

The invention relates to an actuating drive having an electric motor and a gearing, wherein the electric motor and the gearing are arranged in a housing which is open on one side thereof and which is closed by a cover, and wherein the electric motor is mounted in a recess bulge which is substantially sealed off from the gearing and which forms part of the housing.

BACKGROUND OF THE INVENTION

Such actuating drives, which are also termed actuators, are known. They are used to adjust control elements. Particularly in the case of the construction of motor vehicles, installation situations must frequently be taken into account where only very little constructed space is available for the actuating drive, and the actuating drive must therefore be given a very compact design. In this case, the requirements for performance, robustness, and reliability must be met, which limits the compactness of an actuating drive; the same must also have a certain minimum size for electrical, and particularly mechanical, reasons. This is particularly true for applications of the actuating drive for turbochargers.

WO 2009/130 249 A1, for example, describes an actuating drive wherein one axis of an electric motor is perpendicular to axes of the gearing.

So that the electric motor works without problem in the long term, wherein it is possible to directly and precisely apply [the] control signals at the electric motor to an element being controlled, it is necessary for the electric motor to be positioned as precisely as possible relative to the gearing. In particular, a radial orientation of the electric motor with respect to a first gear of the gearing is significant in this case, so that a predetermined distance is ensured between the axis of the electric motor and the axis of the first gear with which the output pinion of the electric motor engages. The applicant is aware of the practice of using metal sheet for the radial orientation and fixation; for the axial positioning, it is necessary to use additional components such as shaft washers or plate springs. As a result, the radial and axial positioning in known actuator motors as a whole is relatively time-consuming and high-cost.

Therefore, the problem addressed by the invention is that of creating an actuating drive wherein the exact positioning of an electric motor relative to a first gear is ensured, wherein said actuating drive is simpler and more cost-effective than those which could previously be manufactured.

SUMMARY OF THE INVENTION

An electric motor is attached indirectly to the housing by means of an accordingly shaped metal sheet, and is positioned in a predetermined location with no radial or axial play. The metal sheet can be produced simply and cheaply, for example by stamping and/or laser cutting, as well as optionally by forming by bending. It can be attached to the housing—e.g. by means of bolts—wherein tongues are formed on the metal sheet for the purpose of the positioning in the housing, and these are guided into pockets of the housing without play when the metal sheet is installed. The pockets are positioned opposite each other in such a manner that a straight connection line cuts through a longitudinal axis of the electric motor (corresponding to the longitudinal axis of the output shaft thereof); the attachment means of the metal sheet are likewise arranged on this connection line.

An opening is created centrally between the tongues of the metal sheet, the shape of said opening substantially corresponding to the upper end of the electric motor which is functionally assigned to the output; this means that when the actuating drive is assembled, the upper end of the electric motor, which is designed in the form of a motor bearing, for example, passes through the opening with minimal or no play. In this manner, the output assumes a precise, predetermined position in the housing with no play. Because the axles and/or shafts of the gearing are also exactly positioned in the housing, the relative positions of the axles and/or shafts with respect to each other in the housing are determined exactly and with no play. In this manner, the configuration ensures a high operational reliability and actuating precision of the actuating drive, while providing a cost-effective production and simple assembly.

The dependent claims relate to the advantageous embodiment of the invention. In one embodiment, the metal sheet is made of spring steel. In this way, it is possible to generate axial pretension in a precise manner, simplifying and ensuring the exact axial positioning of the electric motor.

In a further embodiment, the metal sheet has an opening for the purpose of receiving an upper end of the electric motor. The opening either has no play with respect to the upper end, or as an alternative there is a small amount of play, wherein in the latter case flexible tongues are designed facing into the opening, and exert a radial pressure on the upper end. In this way, the position of the electric motor, and particularly the upper end thereof in the metal sheet, is fixed, which when combined with the attachment of the metal sheet in the housing, enables an exact positioning.

In a further embodiment, ribs are arranged in pockets of the housing, said pockets being designed as positioning elements for the metal sheet. The ribs have an excess with respect to the metal sheet, such that the position of the metal sheet in the housing in a predetermined position is precisely ensured.

In one further embodiment, the metal sheet is bolted to the housing. This is the simplest to implement, because the metal sheet exerts a force axially on the electric motor.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
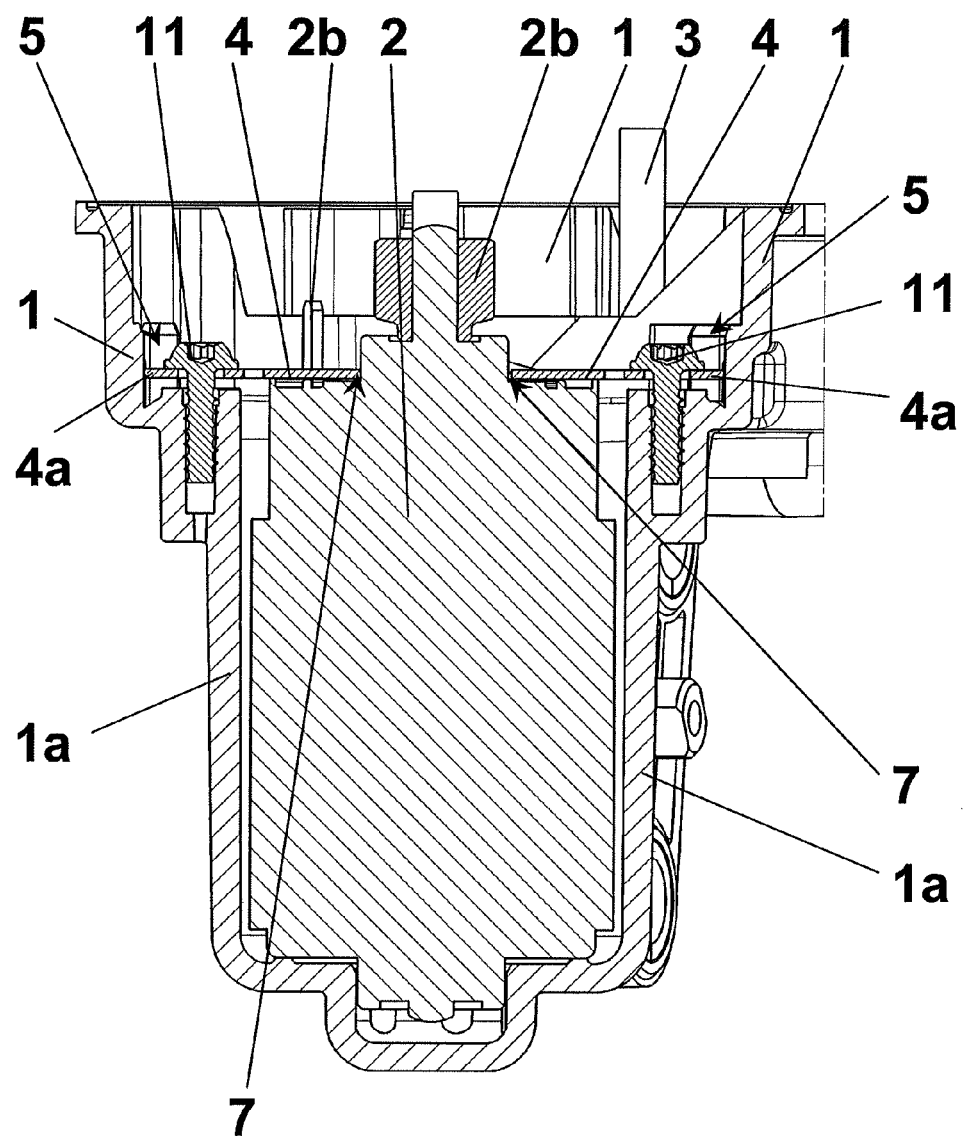
FIG. 1 shows a perpendicular cutaway through an open actuating drive, gearing cut off and bolts not tightened.
Figure 2:
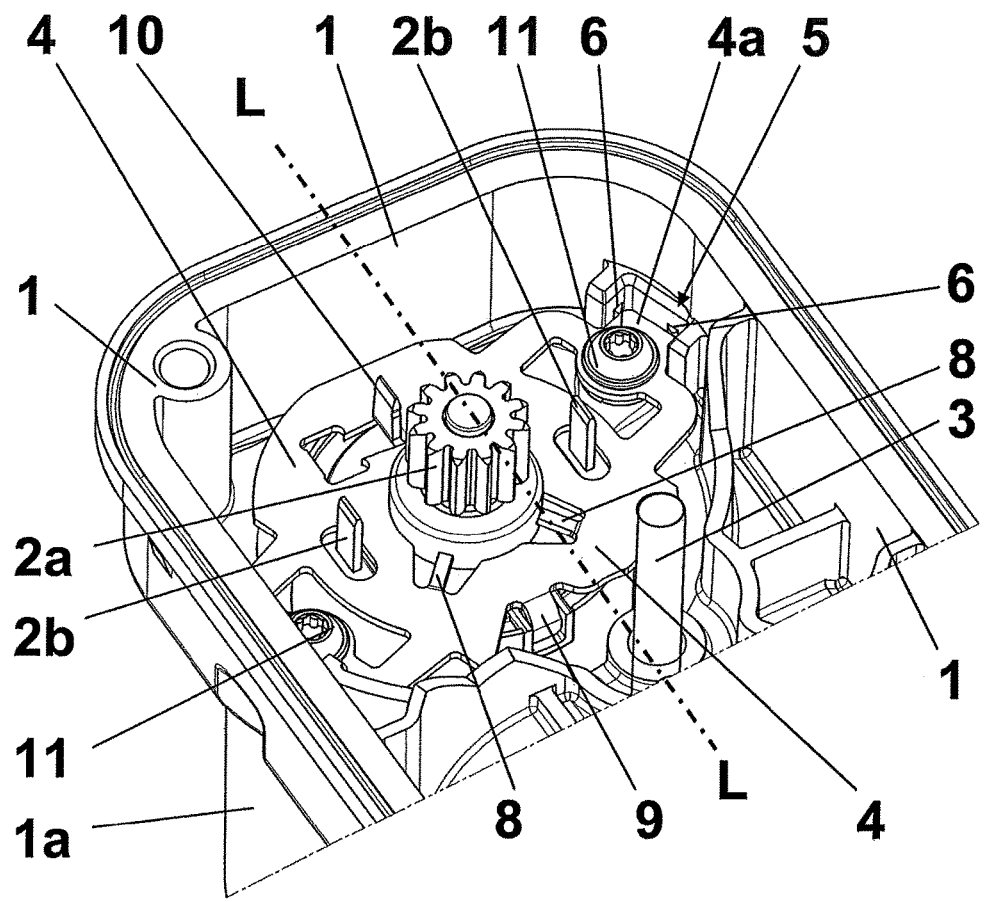
FIG. 2 shows a perspective view from above of the actuating drive in FIG. 1.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

As can be seen in the FIGS. 1 to 4, an actuating drive has a housing 1, and a cover and an output shaft, which are not illustrated, said output shaft passing through the cover. The housing 1 and the cover are made of plastic.

The housing 1 has a substantially cuboid shape, with a recess bulge 1a which projects from a base, and has an open side which is opposite the base. The recess bulge 1a is a part of the base, and therefore of the housing 1, and has a substantially circular inner cross section. It is arranged in an end region—with respect to a longitudinal axis L of the box-shaped part—of the housing 1, and is sized for receiving a radially symmetric electric motor 2. The electric motor [2] is attached in the recess bulge 1a, and on its upper end, which projects into the box-shaped part of the housing 1, has an output shaft with a pinion 2a as part of a reduction gearing. The upper end is designed as a motor bearing, by way of example, and is highly narrowed with respect to the primary portion of the electric motor 2. Two first contact tongues 2b for an electrical connection of the electric motor 2 are arranged at a radial distance from the output shaft.

The majority of the reducing gearing is not illustrated, and is arranged in the box-shaped portion of the housing 1, wherein the individual gears are mounted on axles 3 associated thereto. The axles 3, of which a first axle is illustrated, are arranged precisely at predetermined positions on the base of the housing 1, such that the gears engage with each other without play and without interference. The pinion 2a should assume a predetermined position with respect to the first axle 3 as precisely as possible.

Figure 5:
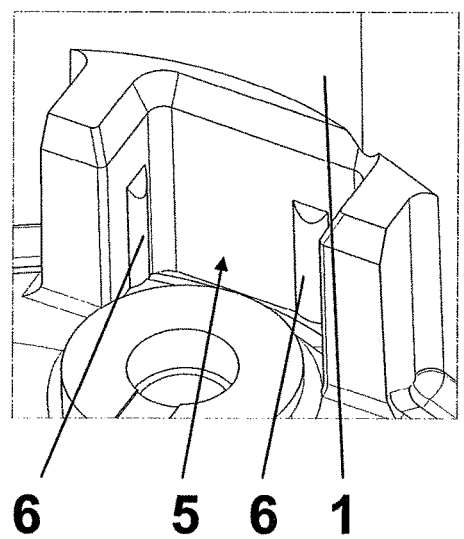
FIG. 5 shows a perspective view of a pocket in a detail view.
Figure 3:
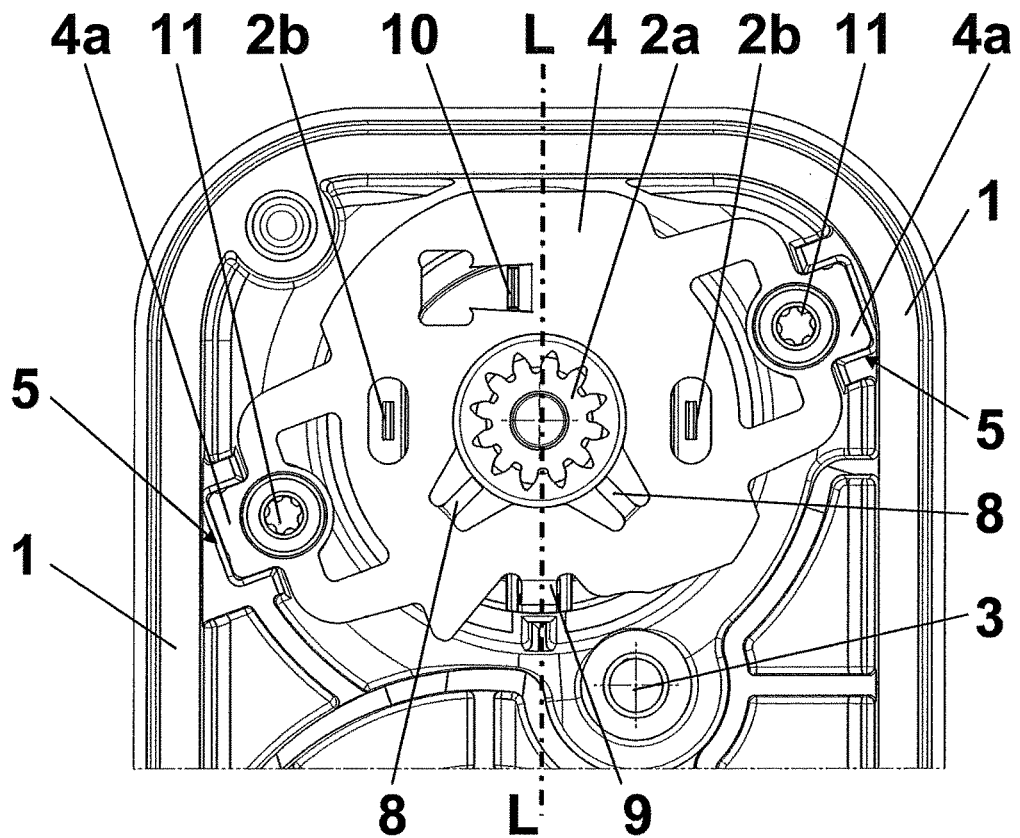
FIG. 3 shows a top view of the actuating drive in FIG. 1.
Figure 4:
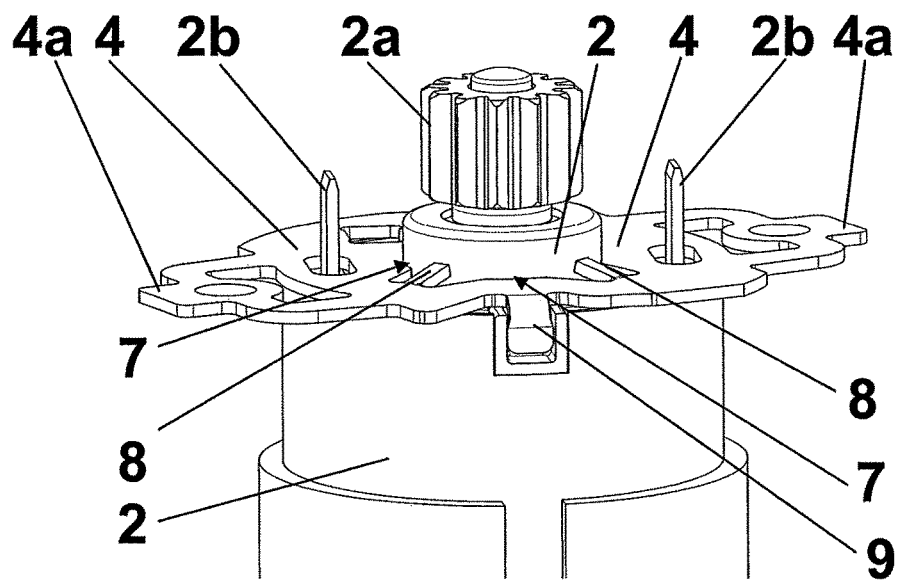
FIG. 4 shows a side view of a part of an electric motor having a metal sheet.

The electric motor 2 is attached and positioned in the housing 1 by means of a metal sheet 4. For this purpose, two pockets 5 are formed on walls of the housing 1 as positioning elements for the metal sheet 4, each of which has a C-shape in a top view, has a base, and has two arms at right angles to said base; one side of each pocket 5 which faces toward the interior of the housing 1 is open. One of the pockets 5 is illustrated in FIG. 5 as a detail view. Each base and each arm is straight. A rib 6 with a semicircular cross section is molded onto the inner side of each base and of each arm which is distanced from the gearing. The pockets 5 are positioned diametrically opposed to the recess bulge 1a, and determine the position of the metal sheet 4 in the housing 1.

The metal sheet 4 is made of spring steel. Its longitudinal extension corresponds to the distance between the bases of the pockets 5, plus a minimal play. A tongue 4a which is substantially rectangular is constructed on each longitudinal end of the metal sheet 4, said end being assigned to one of the pockets 5. The area dimensions of the tongue 4a correspond to the inner dimensions of the pocket 5, excluding a minimal play. A bore hole for a bolt 11 is arranged adjacent to each tongue 4a, inside thereof in the axial dimension.

A substantially circular opening 7 is included centrally between the longitudinal ends of the metal sheet 4, the diameter of said opening [7] corresponding to that of the upper end of the electric motor 2, plus a minimal play. A center point of the opening 7 has a predetermined distance from the first axle 3 when the metal sheet 4 is installed in the housing 1. The opening 7 has two tongue-like extensions which face in the direction of the gearing, and which are positioned at an angle of approx. 45° to the longitudinal axis L of the housing 1. A flexible tongue 8 is constructed centrally in each of the extensions as a single piece with the metal sheet 4, and the free end of each of these projects slightly into the circular part of the opening 7, and thereby has an excess with respect to the upper part of the electric motor 2.

As an alternative thereto, the opening 7 differs therefrom in that it is circular and has, as a whole, an excess with respect to the upper part of the electric motor 2.

In addition, two passages for the contact tongues 2b are arranged with a large degree of play in the metal sheet 4. So that these are properly oriented with respect to the metal sheet 4 during assembly, a positioning tab 9 is arranged on the outer periphery of the metal sheet [4], and is bent downward at a right angle and engages in a corresponding recess in the upper part of the electric motor 2.

In addition, a second contact tongue 10 is arranged on the metal sheet 4, and is bent downward at a right angle and is included for a connection to the electromagnetic interference suppressor.

Means for the attachment of the actuating drive are arranged on the outside of the housing 1—for example centering means and bore holes for attachment bolts.

The housing 1 is tightly closed on the open side by means of the cover. The cover has a plug on the outside thereof to connect the actuating drive electrically to an on-board vehicle power supply, the same at least partially comprising a control of the actuating drive. At least one circuit board with electrical and/or electronic components is attached in the cover and is electrically connected to the plug.

The circuit board can contain parts of the control functions, and has indirect contact with the electric motor 2.

For the assembly, the metal sheet 4 is first press-fitted onto the upper part of the electric motor 2, wherein the same passes through the opening 7, and wherein the positioning tab 9 is guided into the associated recess of the electric motor 2. The flexible tongues 8 in this case press the upper part against the limit of the opening 7 which is opposite the gearing, without any play, such that the electric motor 2 has a precise position relative to the metal sheet.

Next, the electric motor 2 is inserted into the housing 1 with the metal sheet 4. In this process, the tongues 4a are pressed into the pockets 5, and as a result, the excess of the ribs 6 is displaced and/or sheared off. Bolts 11 are guided through the bore holes of the metal sheet 4 and tightened in the housing 1. As a result, the metal sheet 4 and, indirectly, the electric motor 2 as well, are fixed in the housing without any play, and are precisely positioned in the predetermined location. In this way, the configuration ensures the predetermined position of the output shaft, with the pinion 2a, relative to the first axle 3. In addition, the metal sheet 4 is tensioned against the electric motor 2 when the bolts 11 are tightened, such that the electric motor [2] is also secured in its axial position. It must be noted that the metal sheet 4 in the figures is drawn without pretension—meaning that the bolts 11 are only screwed into position and not yet tightened to a predetermined torque.

The gearing parts, such as gears, shafts, and optionally bearings, are inserted into the housing 1.

Finally, the housing 1 is tightly sealed by the cover, in which the circuit board is arranged, by placing the cover thereon and welding the same to the housing 1, for example. When the cover is placed, the contact tongues 2*b*, 10 form a contact with the circuit board.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE NUMBERS

1 housing
1*a* recess bulge
2 electric motor
2*a* pinion
2*b* first contact tongue
3 axle
4 metal sheet
4*a* tongue
5 pocket
6 rib
7 opening
8 spring tongue
9 positioning tab
10 second contact tongue
11 bolt
L longitudinal axis of the housing

The invention claimed is:

1. An actuating drive, comprising:
   an electric motor and a gearing, wherein the electric motor and the gearing are arranged in a housing which is open on one side thereof and which is closed by a cover,
   a recess bulge in the housing in which the electric motor is mounted, and which is substantially sealed off from the gearing,
   at least one pocket formed in the housing formed by a base extending inwardly from the housing and by opposing arms extending from either side of the base;
   at least one rib arranged in the at least one pocket, wherein said rib extends inwardly from the base or an arm of the pocket;
   a metal sheet indirectly attaching the electric motor to the housing, wherein the metal sheet is positioned in a predetermined location with no radial or axial play, and
   at least one tongue extending from said metal sheet, wherein each of said at least one tongue is received by a respective pocket, and wherein said at least one rib deforms to allow the pocket to receive the tongue therein, thereby securing the metal sheet with no radial play.

2. The actuating drive according to claim 1, wherein the metal sheet is made of spring steel.

3. The actuating drive according to claim 1, wherein the metal sheet has an opening for receiving an upper end of the electric motor.

4. The actuating drive according to claim 3, wherein the opening has no play toward the upper end.

5. The actuating drive according to claim 3, wherein the opening has a small amount of play toward the upper end, and wherein flexible tongues are formed which face into the opening and which exert pressure on the upper end.

6. The actuating drive according to claim 1, wherein the metal sheet is bolted to the housing.

* * * * *